United States Patent [19]
Johnson et al.

[11] Patent Number: 5,589,641
[45] Date of Patent: Dec. 31, 1996

[54] STRAIN AND FABRY-PEROT ETALON MEASUREMENT SYSTEM AND METHOD

[75] Inventors: Bartley C. Johnson, Clayton; John H. Belk, St. Louis, both of Mo.

[73] Assignee: McDonnell Douglas Corporation, St. Louis, Mo.

[21] Appl. No.: 461,820

[22] Filed: Jun. 5, 1995

[51] Int. Cl.$^6$ ........................................ G01L 1/24
[52] U.S. Cl. ........................................ 73/800; 250/227.16
[58] Field of Search ................. 73/760, 800; 356/35.5, 356/352; 250/227.14, 227.16, 227.19, 227.27; 385/12, 13

[56] References Cited

U.S. PATENT DOCUMENTS

| | | | |
|---|---|---|---|
| 4,368,981 | 1/1983 | Ozeki | 356/352 |
| 4,717,253 | 1/1988 | Pratt, Jr. | 73/800 |
| 5,201,015 | 4/1993 | Von Bieren et al. | 356/345 |
| 5,301,001 | 4/1994 | Murphy et al. | 73/800 |
| 5,367,583 | 11/1994 | Sirkis | 356/352 |
| 5,392,117 | 2/1995 | Belleville et al. | 356/352 |

*Primary Examiner*—Richard Chilcot
*Assistant Examiner*—Max Noori
*Attorney, Agent, or Firm*—Dale B. Halling

[57] ABSTRACT

A system and method for absolute, high resolution and accurate strain measurement includes a low-coherence light source (12) transmitting light through a strain sensor (18) and into an interferometer (26). The interferometer (26) has a high-coherence light source (48) that parallels the light from the low-coherence light source (12). The output of the interferometer is detected by a photodetector (46). The photodetector (46) is connected to a phase measuring circuit (30), that is in communication with a controller (28). The controller (28) is also connected to a motor (44) that adjusts the optical path lengths in the interferometer (38). The phase change in the high-coherence source from the fringe pattern (68) of the strain sensor (18) before and after a strain is applied to the device under test is used to determine the strain.

22 Claims, 3 Drawing Sheets

STRAIN AND FABRY-PEROT ETALON MEASUREMENT SYSTEM AND METHOD

The Government has rights in this invention pursuant to Contract No. MDA972-90-C-0026 awarded by the United States Navy.

FIELD OF THE INVENTION

The present invention relates generally to strain measurement systems and more particularly to an optical system and method for high resolution measurement of absolute strain and measurement of the optical distance between the mirrors of a Fabry-Perot etalon.

BACKGROUND OF THE INVENTION

Fabry-Perot etalons have been used for sensing and measuring strain. In one method a low-coherence light source is coupled into an optical fiber that contains a Fabry-Perot etalon. The Fabry-Perot etalon is attached to the device undergoing strain. The output of the Fabry-Perot etalon is fed into a Michelson interferometer. Michelson interferometers measure coherence and have the characteristic that when the two optical paths of the Michelson interferometer are equal in length a fringe (interference) pattern is formed at the output of the Michelson interferometer. A second fringe pattern occurs when the difference between the two internal optical path lengths is equal to the optical path length of the Fabry-Perot etalon contained in the fiber optic cable. This occurs because the optical path length between one of the etalon mirrors and one of the Michelson interferometer's mirrors is equal to the optical path length between the other etalon mirror and the other Michelson interferometer's mirror. When the optical path length of the Fabry-Perot etalon changes due to the strain of the test device, this shows up as shift in the fringe (interference) pattern. The only way to measure this difference is to calibrate the gears, driving the mirrors, that vary the optical path length inside the Michelson interferometer. Unfortunately, this results in only low resolution measurements of the optical path lengths and limits the system to low resolution strain measurements.

Previous, relative, high resolution strain measurement systems have been designed by replacing the low-coherence light source with a high-coherence light source. The high coherence light source produces a fringe pattern over a relatively large range of optical path length differences. When the optical path length of the Fabry-Perot etalon is changed, the fringes or variations in lines of darkness and light move across the image plane of the Michelson interferometer. The movement of one fringe (light line to light line) corresponds to one wavelength of change in the optical path length. Thus it is possible, by counting or measuring the movement of the fringe patterns, to accurately and with high resolution, determine the change in optical path length and therefore the strain of the device under test. Unfortunately, the fringe pattern looks essentially the same over large differences in optical path lengths. As a result, it is impossible to measure the optical path length of the Fabry-Perot etalon before attaching it to the device under test. While it is possible to count fringes as the Fabry-Perot etalon is attached to the device under test, this may not be possible for a variety of reasons. For instance, the device may be undergoing such rapid change in strain that the fringes cannot be counted, or it is necessary to measure the strain of the device over long periods of time, which requires not losing count of the fringes. This may not be practical due to short term perturbations in the device under test or loss of power.

Thus there exists a need for a high resolution, accurate strain measurement system that can also determine the absolute strain.

SUMMARY OF THE INVENTION

A strain measurement system that fulfills these needs includes an optical strain sensor having a low-coherence source of light as an input. An output of the optical strain sensor is input to an interferometer. A high-coherence light source is also input to the interferometer. In one embodiment the interferometer is a Michelson interferometer with its output coupled to a photodetector.

A method of measuring strain that overcomes the stated shortcomings of the prior art involves the steps of: transmitting a low-coherence light through an optical strain sensor; coupling an output of the optical strain sensor and a high-coherence light source into a coherence detector; finding an equal optical path length point; measuring a first phase change of the high-coherence light source from the equal optical path length point to a first optical path length of the strain sensor; applying a strain to the optical strain sensor; measuring a second phase change of the high-coherence light source from the equal optical path length point to a second optical path length of the strain sensor; and calculating a difference phase change from the first phase change and the second phase change.

DESCRIPTION OF THE PREFERRED EMBODIMENTS

Figure 1:
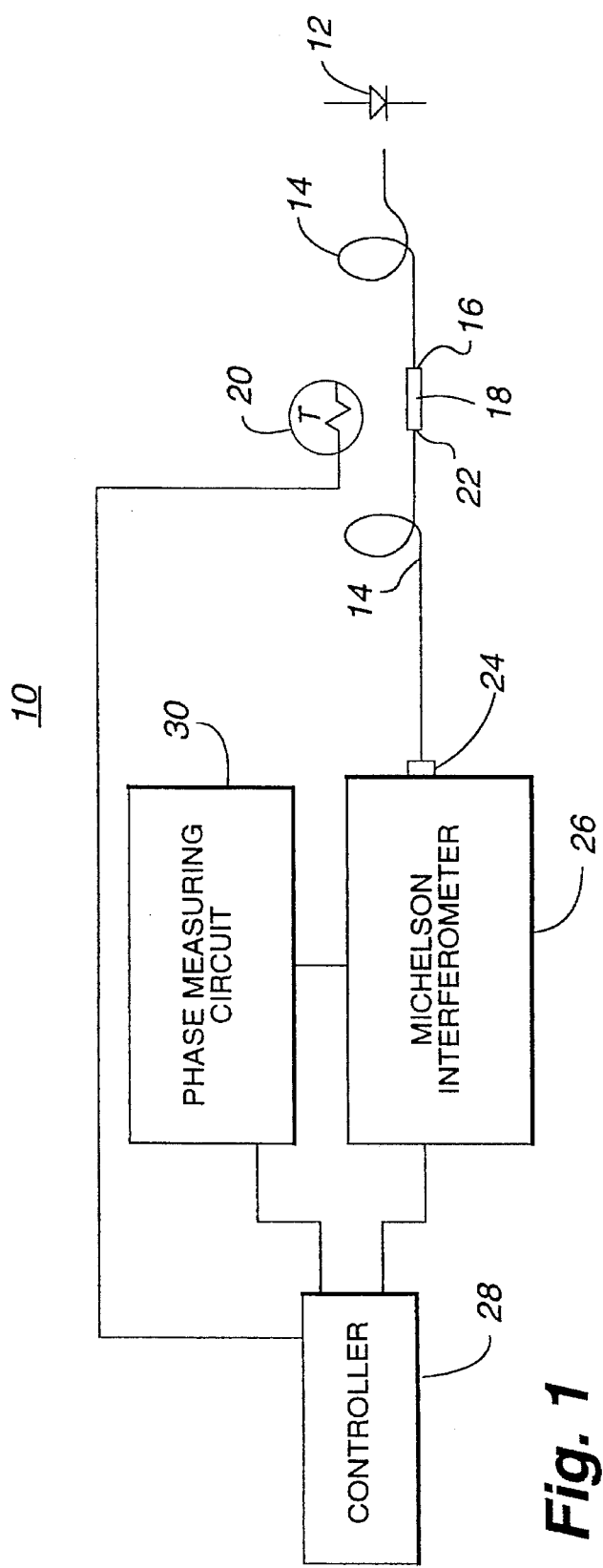
FIG. 1 is a block diagram of a strain measurement system.

A strain measurement system 10, shown in FIG. 1, includes a low-coherence light source 12 which can be a superluminescent light emitting diode. An output of the low-coherence light source 12 is input to an optical fiber (waveguide) 14 that carries the light to an input 16 of a strain sensor 18. The strain sensor 18 can be a Fabry-Perot etalon. The strain sensor 18 can optionally include a temperature sensor 20. The temperature sensor 20 can be a thermistor or an optical temperature sensor. An output 22 of the strain sensor 18 is connected to an input 24 of a Michelson interferometer (means for creating self interference or coherence detector) 26. The Michelson interferometer 26 can be replaced by other types of interferometers such as Mach-Zehnder. The Michelson interferometer 26 is controlled by a controller 28, which is also connected to a phase measuring circuit 30 and a temperature sensor 20. The phase measuring circuit 30 could be a phase lock loop, a threshold detector and counter for counting peaks or a digital oscilloscope.

Figure 2:
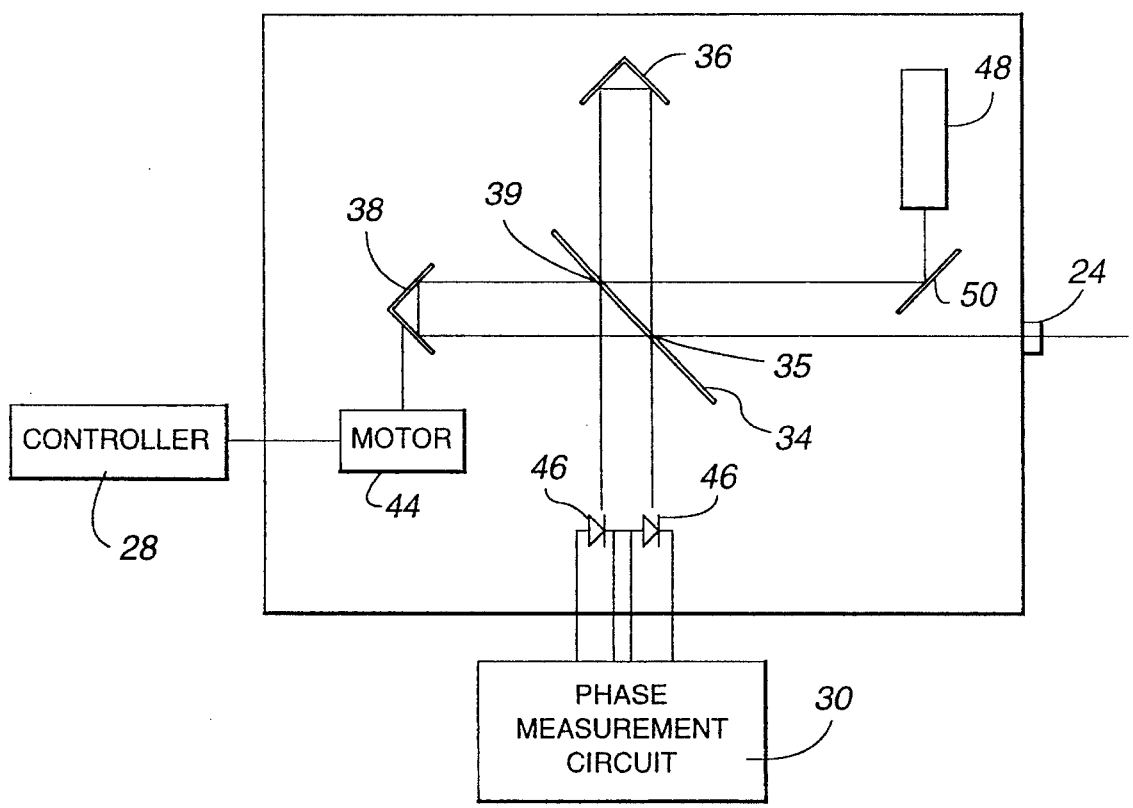
FIG. 2 is a schematic diagram of the Michelson interferometer of FIG. 1.

The Michelson interferometer 26 is shown in more detail in FIG. 2. The input 24 from the strain sensor 18 meets a beam splitter 34 at a first point 35. The beam splitter 34 causes half the light to be reflected to a first corner cube 36 and half the light to continue on to a second corner cube 38.

The corner cubes 36, 38 can be replaced by prisms, to perform the retroreflector function. The light from the input 24 passes through a first path formed by the first point 35 to the first corner cube 36 and back to the beam splitter 34 at a second point 39. A second path is formed by the first point 35 to the second corner cube 38 and back to the second point 39. A motor 44 is used to introduce differences in the first and second optical path lengths (optical path length differential), by moving the second corner cube 38 forwards or backwards. As is well known by those skilled in the art, a fringe (interference pattern) is formed when the first and second optical path lengths are equal (equal optical path length point). The interference pattern is detected by a photodetector 46. A helium neon (HeNe) laser 48, has its light directed by a mirror 50 into the interferometer 26. The light meets the beam splitter 34 at the second point 39. The light from the HeNe laser 48 follows the same paths as the light from the input 24, except in reverse direction. Another photodetector 46 is used to detect the light from the HeNe laser 48.

Figure 3:
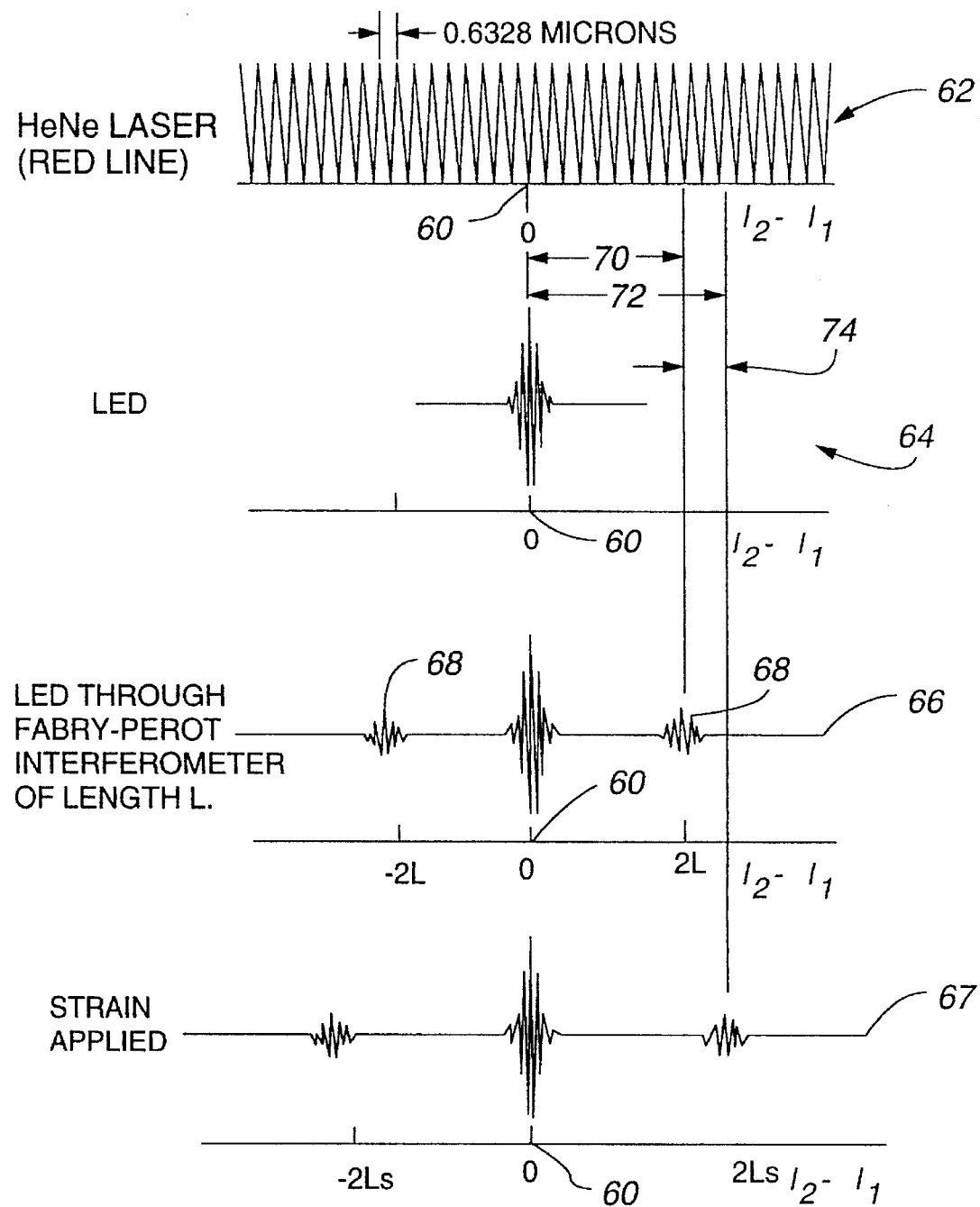
FIG. 3 is a schematic diagram of the output of the Michelson interferometer of FIG. 1.

The motor 44 is controlled by the controller 28. The controller 28 first adjusts the second corner cube 38 so that the first and second optical paths are equal (equal optical path length point 60, see FIG. 3). This results in the fringe pattern of shown in FIG. 3 where $(l_2-l_1)$ is zero. The top trace 62 shows how the interferometric output from the HeNe laser 48 as the difference in the first and second optical path lengths $(l_2-l_1)$ is changed. The second trace 64 shows the interferometric output from the light emitting diode 12. The third trace 66 shows the interferometric output when the strain sensor 18 is inserted between the light emitting diode and the interferometer 28 and the forth trace 67 shows the interferometric output of the strain sensor 18 after a strain has been applied. The controller adjusts the second corner cube 38 so that the fringe pattern 68 due to the strain sensor 18 is visible. At the same time the phase measuring circuit 30 measures a first total phase change 70 of the fringe pattern 62 formed by the HeNe laser 48 from the equal optical path length point 60 to the strain sensor fringe pattern 68 and communicates the first total phase change 70 to the controller 28. The strain sensor 18 is then attached to the device under test and any strain the device undergoes is sensed by the strain sensor 18. A second total phase change 72 is determined in the same manner as the first total phase change 70. The controller then calculates a phase difference 74 between the first and second total phase change 70, 72. The phase difference 74 is related to an optical distance by multiplying the phase difference by the wavelength of the HeNe laser 48 (0.6328 μm) divided by 2π. A strain is proportional to the phase difference 74 and can be adjusted according to the temperature of the material of the device under test, depending on the material of the device under test.

Figure 4:
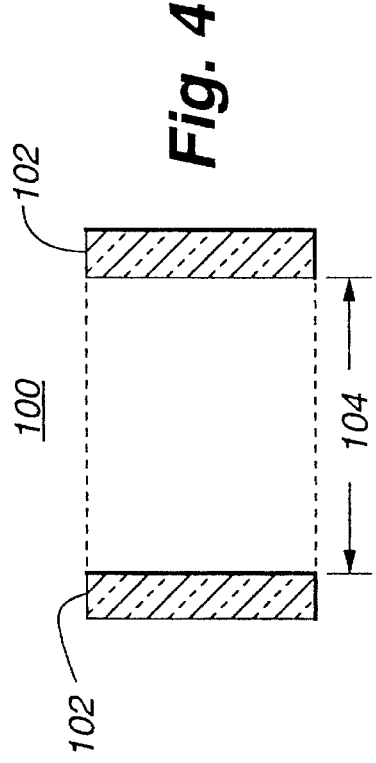
FIG. 4 is a schematic diagram of a Fabry-Perot etalon.

The strain measurement system 10, of FIG. 1, can also be used to accurately measure the optical path length of a Fabry-Perot etalon (interferometer) 100, shown in FIG. 4. The Fabry-Perot etalon 100 consists of a pair of mirrors 102 running parallel to each other. The Fabry-Perot etalon 100 has an optical path length 104 equal to the perpendicular distance between the pair or mirrors 102 times the index of refraction (i.e., vacuum=1) of the medium between the mirrors 102. The process is essentially the same as described above, except the sensor 18 is the Fabry-Perot etalon 100 and the second total phase change 72 measurement is unnecessary. The first total phase change 70 is converted to a distance 104 (i.e., the optical distance between the mirrors) using the formula given above.

Thus there has been described a system and a method for determining the absolute strain with high accuracy and resolution. Further the system and method can be used to accurately determine the optical distance between mirrors in a Fabry-Perot interferometer.

While the invention has been described in conjunction with specific embodiments thereof, it is evident that many alternatives, modifications, and variations will be apparent to those skilled in the art in light of the foregoing description. Accordingly, it is intended the invention embrace all such alternatives, modifications, and variations as fall within the spirit and broad scope of the appended claims.

What is claimed is:

1. A strain measurement system, comprising:
    a low-coherence light source;
    an optical fiber connected to an output of the low-coherence light source;
    a strain sensor having an input coupled to the optical fiber;
    a high-coherence light source; and
    an interferometer having an input coupled to the high-coherence light source and coupled to an output of the strain sensor.

2. The strain measurement system of claim 1, wherein the interferometer is a Michelson interferometer.

3. The strain measurement system of claim 2, wherein the Michelson interferometer has an output coupled to a photodetector.

4. The strain measurement system of claim 2, wherein the strain sensor is a Fabry-Perot interferometer.

5. The strain measurement system of claim 2, wherein the high-coherence light source is a helium-neon laser.

6. The strain measurement system of claim 3, further including a controller coupled to the Michelson interferometer and controlling an optical path length differential.

7. The strain measurement system of claim 6, further including a phase measuring circuit coupled to the photodetector and the controller.

8. The strain measurement system of claim 7, wherein the controller determines a strain by determining a phase difference of the strain sensor before and after a strain is applied to the strain sensor.

9. The strain measurement system of claim 8, further including a temperature sensor adjacent the strain sensor.

10. A method of measuring strain, comprising the steps of:
    (a) transmitting a low-coherence light through an optical strain sensor;
    (b) coupling an output of the optical strain sensor and a high-coherence light source into a coherence detector;
    (c) determining an equal optical path length point;
    (d) measuring a first phase change of the high-coherence light source from the equal optical path length point to a first optical path length of the strain sensor;
    (e) applying a strain to the optical strain sensor;
    (f) measuring a second phase change of the high-coherence light source from the equal optical path length point to a second optical path length of the strain sensor; and
    (g) calculating a difference phase change from the first phase change and the second phase change.

11. The method of claim 10, further including the step of converting the difference phase change to a distance.

12. The method of claim 11, further including the step of converting the distance to a calculated strain.

13. The method of claim 12, further including the steps of
    (i) measuring the temperature of the optical strain sensor; and (ii) adjusting the calculated strain for the temperature.

14. A system for measuring an optical spacing of a Fabry-Perot's mirrors, comprising:

means for generating low-coherence light coupled to an input of the Fabry-Perot sensor;

means for generating high-coherence light; and means for creating a self interference pattern coupled to an output of the Fabry-Perot sensor and to the means for generating high-coherence light.

15. The system of claim 14, wherein the means for generating low-coherence light is a broad linewidth light emitting diode.

16. The system of claim 14, wherein the means for generating high-coherence light is a helium-neon laser.

17. The system of claim 14, wherein the means for creating a self interference pattern is a Michelson interferometer.

18. The system of claim 17, wherein the Michelson interferometer further includes a photodetector.

19. The system of claim 18, further including a controller coupled to the Michelson interferometer, wherein the controller adjusts an optical path length differential in the Michelson interferometer.

20. The system claim 19, further including a phase measuring circuit coupled to the photodetector.

21. The system of claim 20, wherein the controller is coupled to the phase measuring circuit.

22. The system of claim 21, further including a thermistor adjacent to the Fabry-Perot sensor and electrically coupled to the controller.

* * * * *